US011483210B2

(12) United States Patent
Stone

(10) Patent No.: US 11,483,210 B2
(45) Date of Patent: Oct. 25, 2022

(54) INTERDOMAIN PATH CALCULATION BASED ON AN ABSTRACT TOPOLOGY

(71) Applicant: Nokia Solutions and Networks Oy, Espoo (FI)

(72) Inventor: Andrew Stone, Ottawa (CA)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/082,909

(22) Filed: Oct. 28, 2020

(65) Prior Publication Data

US 2022/0131757 A1 Apr. 28, 2022

(51) Int. Cl.
*H04L 41/12* (2022.01)
*H04L 45/02* (2022.01)
*H04L 45/24* (2022.01)

(52) U.S. Cl.
CPC .............. *H04L 41/12* (2013.01); *H04L 45/04* (2013.01); *H04L 45/24* (2013.01)

(58) Field of Classification Search
CPC .......... H04L 41/12; H04L 45/04; H04L 45/24
USPC .......................................................... 709/223
See application file for complete search history.

(56) References Cited

U.S. PATENT DOCUMENTS

| 6,934,249 B1* | 8/2005 | Bertin ..................... H04L 45/00 370/218 |
| 8,824,274 B1* | 9/2014 | Medved .................. H04L 47/20 370/217 |
| 2007/0192474 A1* | 8/2007 | Decasper ............ H04L 67/1078 709/223 |
| 2008/0095176 A1* | 4/2008 | Ong ........................ H04L 47/15 370/400 |
| 2008/0219272 A1 | 9/2008 | Novello et al. |
| 2011/0019674 A1* | 1/2011 | Iovanna .................. H04L 45/12 370/392 |
| 2013/0121340 A1* | 5/2013 | Papadimitriou ........ H04L 45/02 370/410 |

(Continued)

FOREIGN PATENT DOCUMENTS

| EP | 2 173 069 A1 | 4/2010 |
| WO | WO 2009/118050 A1 | 10/2009 |

OTHER PUBLICATIONS

Welzl, "Internet Technology; The "inner network" view, part 2 (D): MPLS", DPS NSG Team, Institute of Computer Science, University of Innsbruck, 4 pages.

(Continued)

*Primary Examiner* — Meng Vang
(74) *Attorney, Agent, or Firm* — Tong, Rea, Bentley & Kim, LLC

(57) ABSTRACT

A processor generates an abstract topology that represents domains in an actual topology of a network and border routers that interconnect the domains in the actual topology. The processor prunes, based on the abstract topology, one or more of the domains from the actual topology during path calculations on the actual topology. In some cases, the processor determines measures of reachability for the nodes to indicate whether the domains represented by the nodes represent are on a path from a source domain to a destination domain. The processor can then selectively prune a relationship to at least one edge in the actual topology or modify weights of edges between the nodes in the actual topology based on the ranks of the nodes in the abstract topology.

23 Claims, 12 Drawing Sheets

(56) References Cited

U.S. PATENT DOCUMENTS

| | | | |
|---|---|---|---|
| 2015/0113056 A1* | 4/2015 | Srinivasan | G06N 7/005 709/204 |
| 2015/0170295 A1* | 6/2015 | Shen | G06Q 50/01 705/319 |
| 2018/0287876 A1* | 10/2018 | Strobel | H04L 41/12 |

OTHER PUBLICATIONS

EP Search Report mailed in corresponding EP Application No. 21201685.1 dated Mar. 22, 2022, 7 pages.

* cited by examiner

INTERDOMAIN PATH CALCULATION BASED ON AN ABSTRACT TOPOLOGY

BACKGROUND

An Internet protocol (IP) network includes interconnected routers that convey packets between a source, such as an ingress router, to the network and a destination, such as an egress router, from the network. The paths between routers in the IP network are determined using interior gateway protocols (IGPs) including link state protocols such as open shortest path first (OSPF, OSPFv3), intermediate system-to-intermediate system (IS-IS), and the like. To determine the network topology, the routers flood the network with information indicating the status of locally connected networks and links of the routers across the network. The routers also store the flooded information in link state databases. Each router in the network builds an identical copy of the network topology based on the status information and then independently computes the paths to every other router (and any advertised networks) using path algorithms such as Dijkstra's Shortest Path First (SPF) algorithm, which computes the shortest paths between the nodes in a graph that represents the routers in the network. In response to the SPF computation, the routers program forwarding state, e.g., to indicate next hop routers for paths to different egress routers. Traffic engineering (TE) techniques such as constrained SPF (CSPF) apply additional constraints to the pathfinding algorithm such as including or excluding areas, domains, or entities, as well as setting requirements for bandwidth, maximum latency, maximum number of hops, and the like. Thus, a TE path may differ from the shortest path determined by an SPF algorithm to satisfy the additional constraints. The paths are associated with labels that are included in packets to indicate the next hop interface for the packet.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
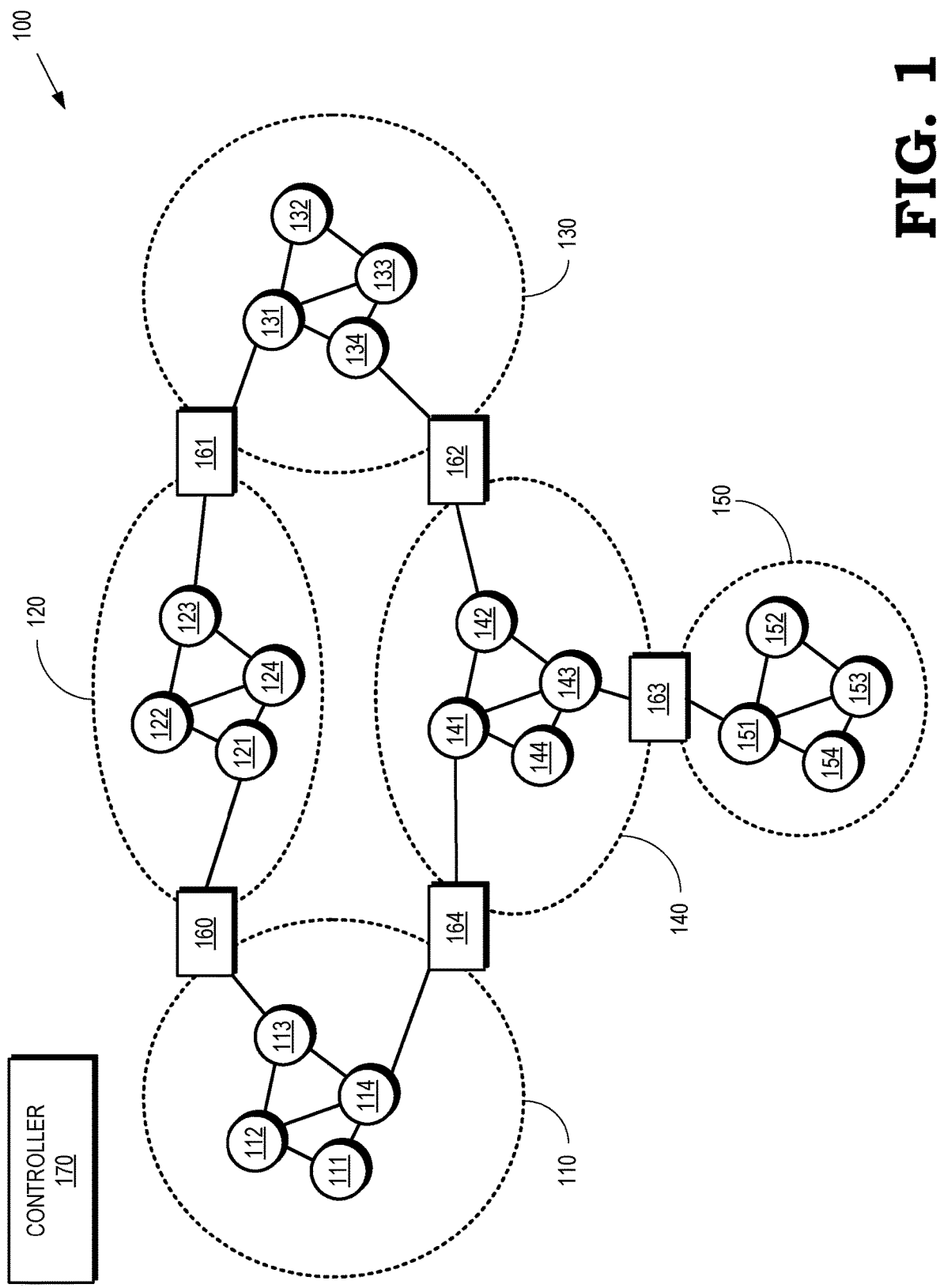
FIG. 1 is a block diagram of an actual topology of an IP network that implements inter-domain path calculations based on an abstract topology derived from the actual topology according to some embodiments.

Service providers are deploying ever larger and more complex IP networks to meet user demands for accessibility and Service Level Agreement (SLA) requirements such as latency and bandwidth. Increasing the size and complexity of the IP network increases the bandwidth consumption and convergence delay for flooding state information through the IP network and increases the computational overhead needed to execute pathfinding algorithms. Routers or links in larger IP networks are therefore subdivided or partitioned into subsets to manage and contain link state flooding. For example, an IGP domain (or IGP instance) can be partitioned into IGP areas that include subsets of the routers in the IGP domain. The IGP areas are interconnected by border routers that stitch together the IGP areas.

Full inter-domain network visibility is not provided to the routers in a conventional network that is partitioned into separate areas. Instead, summaries of the topological information that represents the routers and links in the IGP areas are conveyed between the IGP areas to reduce the bandwidth consumption. Thus, the routers in one IGP area do not possess complete topological information representing the routers and links in other IGP areas. In some cases, multiple IGP instances are also interconnected via border routers and the IGP instances only exchange summarized topological information unless they are explicitly configured for redistribution or they implement an Exterior Gateway Protocol (EGP) such as the Border Gateway Protocol (BGP) between the IGP instances. However, in some cases, the constraints imposed by the SLA require using TE pathfinding techniques to identify TE paths through the network that satisfy the constraints. Individual routers cannot determine TE paths because the detailed topological information for the IGP areas (and, in some cases, the IGP instances) has been summarized between the border routers between different areas as well as between different IGP instances.

Path computation elements (PCE) or other software defined networking (SDN) controllers compute TE paths across IGP areas and domain boundaries. Inter-area and inter-domain topology information that represents links (edges) and routers (nodes) is provided to the PCE/SDN controllers to provide full network visibility so that the PCE/SDN controllers have a complete view of the network. For example, the inter-domain router topology can be represented as a graph of the interconnections between the routers in all the domains of the network, as well as all the links within the domains. The PCE/SDN controllers are therefore able to increase the scope of the search performed by pathfinding algorithms to include the entire graph of the router interconnections. However, this approach reintroduces the problem of increasing computational overhead for the path search because the PCE/SDN controller stores the topological state as one graph entity without including forwarding or border rules to aid in pruning the path search. Furthermore, network topologies used by service providers often include designated core, transit, and access domains (in a core architecture) or leaf and spine domains (in a leaf-and-spine architecture). The core domains (in a core architecture) and the spine domains (in a leaf-and-spine architecture) include more sophisticated, higher capacity routers and should therefore be given preference relative to other domains that include lower capacity routers. For example, in a core configuration, "arc" domains that include paths that bypass the core domain and "leaf" domains that only connected to one another domain should be given lower preference relative to the core domain. These preferences can be represented as constraints that are applied by a TE pathfinding algorithm using a set of TE rules. However, configuring the PCE/SDN controllers to identify different types of domains and the corresponding TE rules is a tedious and error-prone process.

FIGS. 1-12 disclose systems and techniques for reducing the computational overhead required to find paths through a network including routers that are partitioned into multiple domains (or areas), while increasing the likelihood of finding an optimal TE path through the actual topology that represents the network, by generating an abstract topology that represents the domains in the actual topology and border routers that interconnect the domains in the actual topology. The abstract topology is then referenced for pruning decisions when performing path calculations on the actual topology.

The abstract topology is a graph that includes nodes to represent the domains and the border routers. The graph represents a mapping between pairs of domains in the abstract topology and the mapping indicates domains that are used in transit between each pair of domains. The abstract topology also includes measures of reachability of the domains. As used herein, the term "reachability" refers to whether nodes in the graph represent domains along a path from a source domain to a destination domain regardless of whether the domain is part of an optimal or shortest path connecting the source and destination domains. For example, if a path from a first domain to a second domain includes a third domain, the third domain is reachable on the path even if the path is not the shortest path from the first domain to the second domain. In some embodiments, the measure of reachability of a domain indicates how many pairs of domains use the domain as a transit. This measure of reachability is referred to as "betweenness centrality," which indicates how central the domain/node is in the graph based on how many interconnections exist between the node and other nodes in the graph. In some cases, before determining the betweenness centralities of the nodes, temporary links are inserted between the destination node and nodes that do not have a physical link to the destination node. In some embodiments, a rank or a weight is assigned to a domain based on the number of pairs of domains that use the domain as a transit, e.g., based on the betweenness centrality of the node.

Pathfinding through the actual topology is modified based on measures of reachability of the domains in the abstract topology. In some embodiments, the pathfinding algorithm uses the resources of reachable nodes in the abstract topology to prune graph entities in the actual topology during the path search. For example, during pathfinding from a source node to a destination node, a PCE/SDN controller can identify links in the actual topology that are associated with nodes in the abstract topology that are not in a set of reachable nodes for the source and destination nodes. The PCE/SDN controller can then prune these links so that the pathfinding algorithm does not have to consider paths that include routers in the pruned nodes. In some embodiments, the PCE/SDN controller compares the reachability rank of the source node to the ranks of nodes in the abstract topology. If the rank of the node in the abstract topology is lower than the source node rank, and the node is not the destination node for the path, the PCE/SDN controller prunes the relationship to the corresponding edge in the actual topology. In other embodiments, weights of edges between nodes in the actual topology are modified based on the ranks of the referenced nodes in the abstract topology to preference links to higher-ranked nodes during path traversals of the actual topology.

FIG. 1 is a block diagram of an actual topology 100 of an IP network that implements inter-domain path calculations based on an abstract topology derived from the actual topology 100 according to some embodiments. Some embodiments of the IP network are implemented using interior gateway protocols (IGPs) including link state protocols such as open shortest path first (OSPF, OSPFv3), intermediate system-to-intermediate system (IS-IS), and the like.

The actual topology 100 includes routers that are partitioned into domains of the network. In the illustrated embodiment, a domain 110 includes the routers 111, 112, 113, 114 (collectively referred to herein as "the routers 111-114"), a domain 120 includes the routers 121, 122, 123, 124 (collectively referred to herein as "the routers 121-124"), a domain 130 includes the routers 131, 132, 133, 134 (collectively referred to herein as "the routers 131-134"), a domain 140 includes the routers 141, 142, 143, 144 (collectively referred to herein as "the routers 141-144"), and a domain 150 includes the routers 151, 152, 153, 154 (collectively referred to herein as "the routers 151-154"). Although five domains including four routers each are shown in FIG. 1 in the interest of clarity, some embodiments of the actual topology 100 include more or fewer domains including more or fewer routers and the number of routers per domain can differ from domain to domain.

The domains 110, 120, 130, 140, 150 are interconnected by border routers that overlap with multiple domains. In the illustrated embodiment, a border router 160 interconnects the domains 110, 120, a border router 161 interconnects the domains 120, 130, a border router 162 interconnects the domains 130, 140, a border router 163 interconnects the domains 140, 150, and a border router 164 interconnects the domains 110, 140. Although a single border router 160-164 connects pairs of the domains 110, 120, 130, 140, 150 in FIG. 1, some embodiments of the actual topology 100 include other configurations of border routers. For example, multiple border routers can be used to connect a pair of domains. For another example, a single border router can interconnect more than two domains.

A controller 170 receives and stores information representing the actual topology 100. In some embodiments, the controller 170 is implemented as a path computation element (PCE) or software defined networking (SDN) controller that receives and stores information that is flooded by the routers 111-114, 121-124, 131-134, 141-144, and 151-154.

The controller 170 generates an abstract topology that represents the domains 110, 120, 130, 140, 150 and the border routers 160-164 that interconnect the domains 110, 120, 130, 140, 150. The controller 170 also uses the abstract topology to prune one or more of the domains 110, 120, 130, 140, 150 during path calculations on the actual topology 100. Interconnections between the controller 170 and other elements of the actual topology 100 are not shown in FIG. 1 in the interest of clarity.

Figure 2:
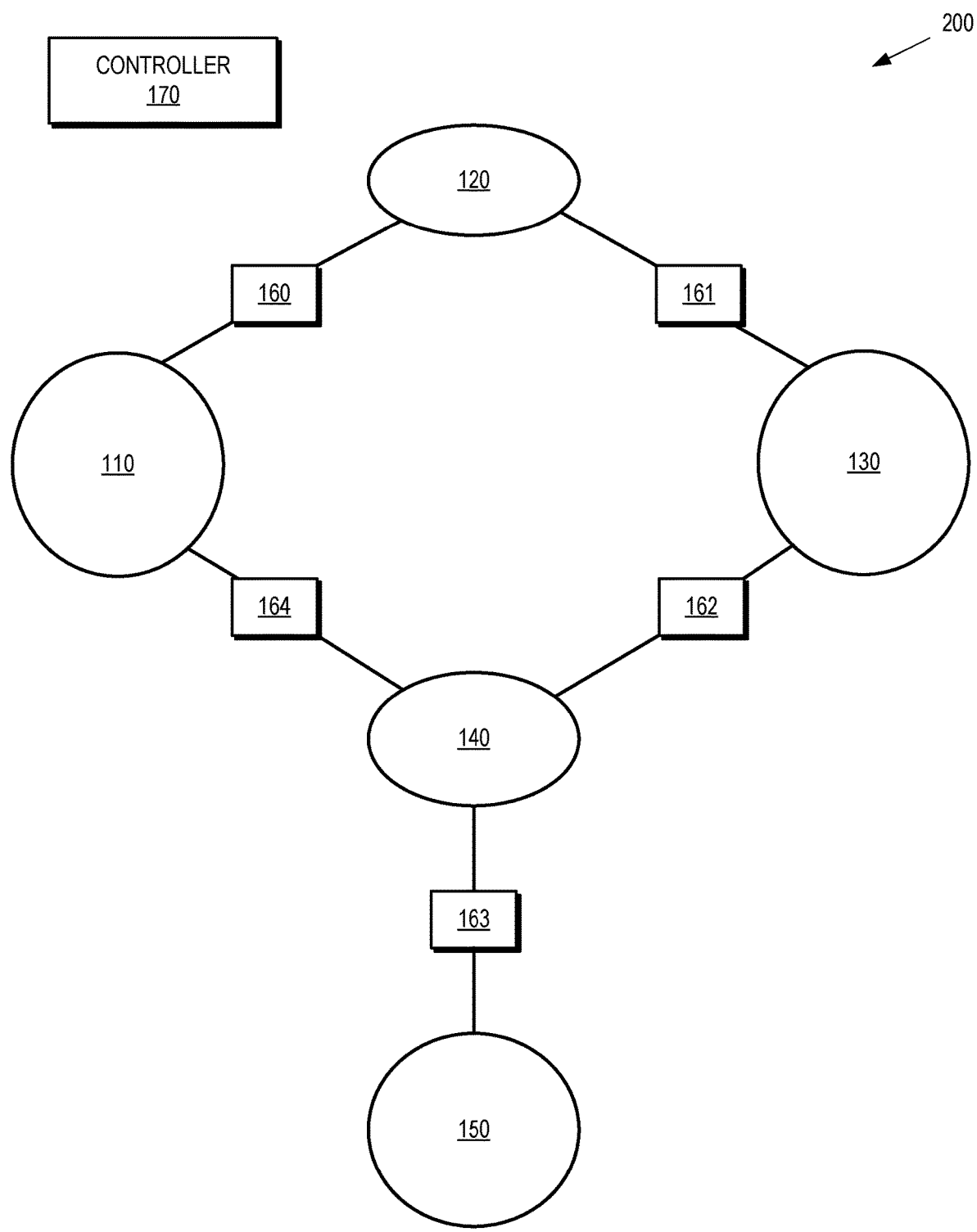
FIG. 2 is a block diagram of an abstract topology derived from the actual topology shown in FIG. 1 according to some embodiments.

FIG. 2 is a block diagram of an abstract topology 200 derived from the actual topology 100 shown in FIG. 1 according to some embodiments. The abstract topology 200 is represented as a graph that includes nodes representing the domains 110, 120, 130, 140, 150 and the border routers 160-164 that form links between the domains 110, 120, 130, 140, 150. As discussed herein, the controller 170 uses the abstract topology to prune one or more of the domains 110, 120, 130, 140, 150 during path calculations on the actual topology 100. Some embodiments of the controller 170 determine measures of reachability for the nodes that represent the domains 110, 120, 130, 140, 150 and the border routers 160-164. The measures of reachability indicate whether the domains 110, 120, 130, 140, 150 represented by the nodes are on a path from a source domain to a destination domain. In some embodiments, the measures of reachability include "betweenness centralities" that indicate how many pairs of domains use the domains associated with the nodes as a transit. Nodes associated with domains that are used by larger numbers of other domains as a transit have a higher betweenness centrality. Nodes associated with domains that are used by smaller numbers of other domains as a transit have a smaller betweenness centrality. Betweenness centralities are determined based on how many interconnections exist between the nodes and other nodes in the graph.

Figure 3:
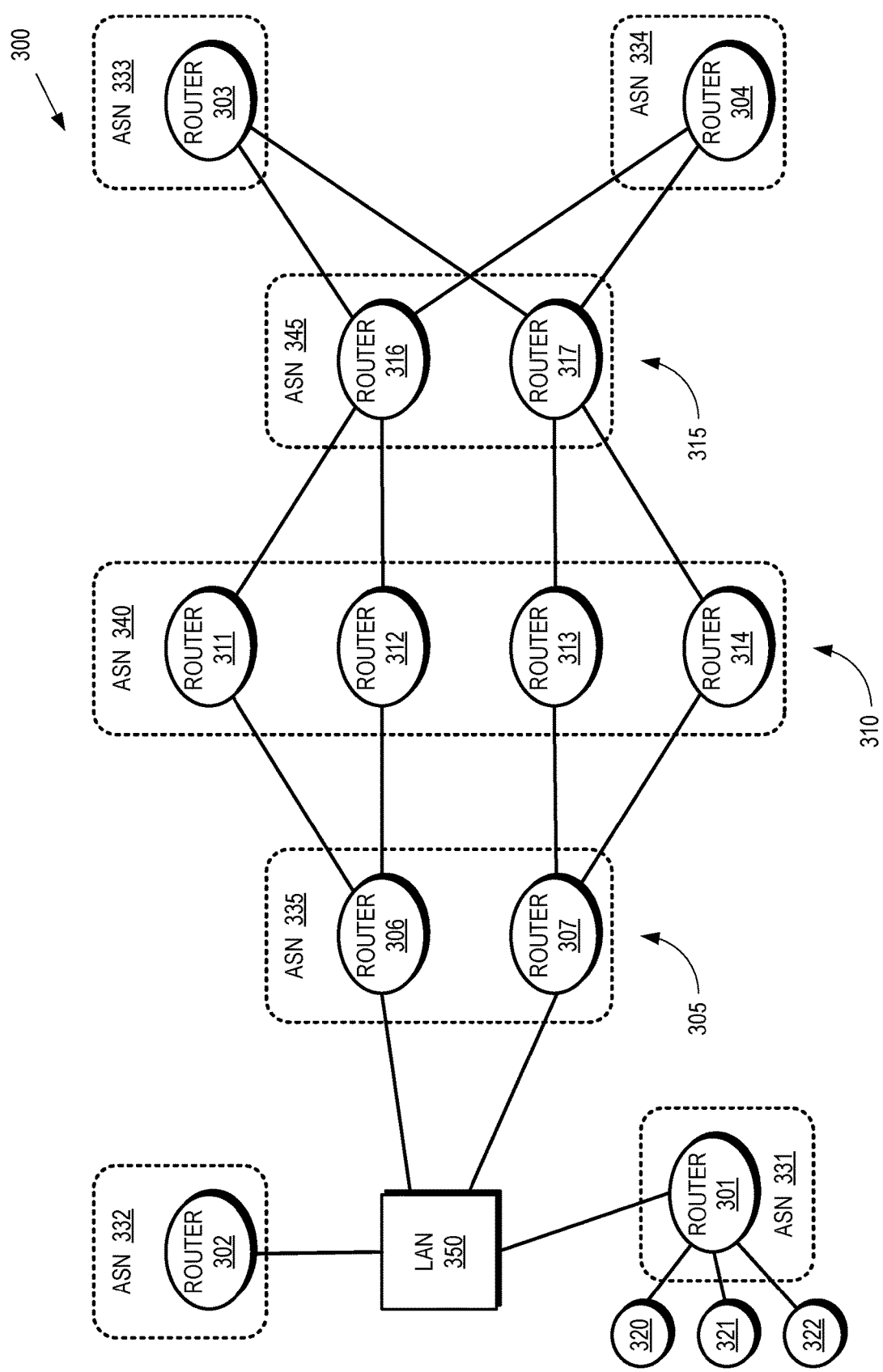
FIG. 3 is a block diagram of a 5-stage Clos network that supports border gateway protocol (BGP) sessions between routers that are interconnected by a multi-access network according to some embodiments.

FIG. 3 is a block diagram of a 5-stage Clos network 300 that supports BGP sessions between routers that are interconnected by a multi-access network according to some embodiments. The 5-stage cost network 300 is implemented in a leaf-and-spine topology that interconnects leaf routers via one or more spines that include spine routers. In the illustrated embodiment, the 5-stage Clos network 300 includes four leaf routers 301, 302, 303, 304 (collectively referred to herein as "the leaf routers 301-304") that are interconnected by spines 305, 310, 315. The spine 305 includes the routers 306, 307, the spine 310 includes the routers 311, 312, 313, 314, and the spine 315 includes the routers 316, 317. The leaf routers 301-304 provide connections to one or more servers such as the servers 320, 321, 322 that are connected to the leaf router 301. The routers and spines are assigned corresponding ASN 331-334, 335, 340, 345. In the 5 stage Clos network 300, the leaf routers 301-304 not directly connected to the spines 305, 315. Instead, the leaf routers 301, 302 are connected to a multi-access network such as the LAN 350. Although not shown in FIG. 3 in the interest of clarity, the actual topology of the 5-stage Clos network 300 can be used to generate an abstract topology analogous to the abstract topology 200 shown in FIG. 2. The abstract topology that represents the 5-stage Clos network 300 is used to prune domains during path-finding, as discussed herein.

Figure 4:
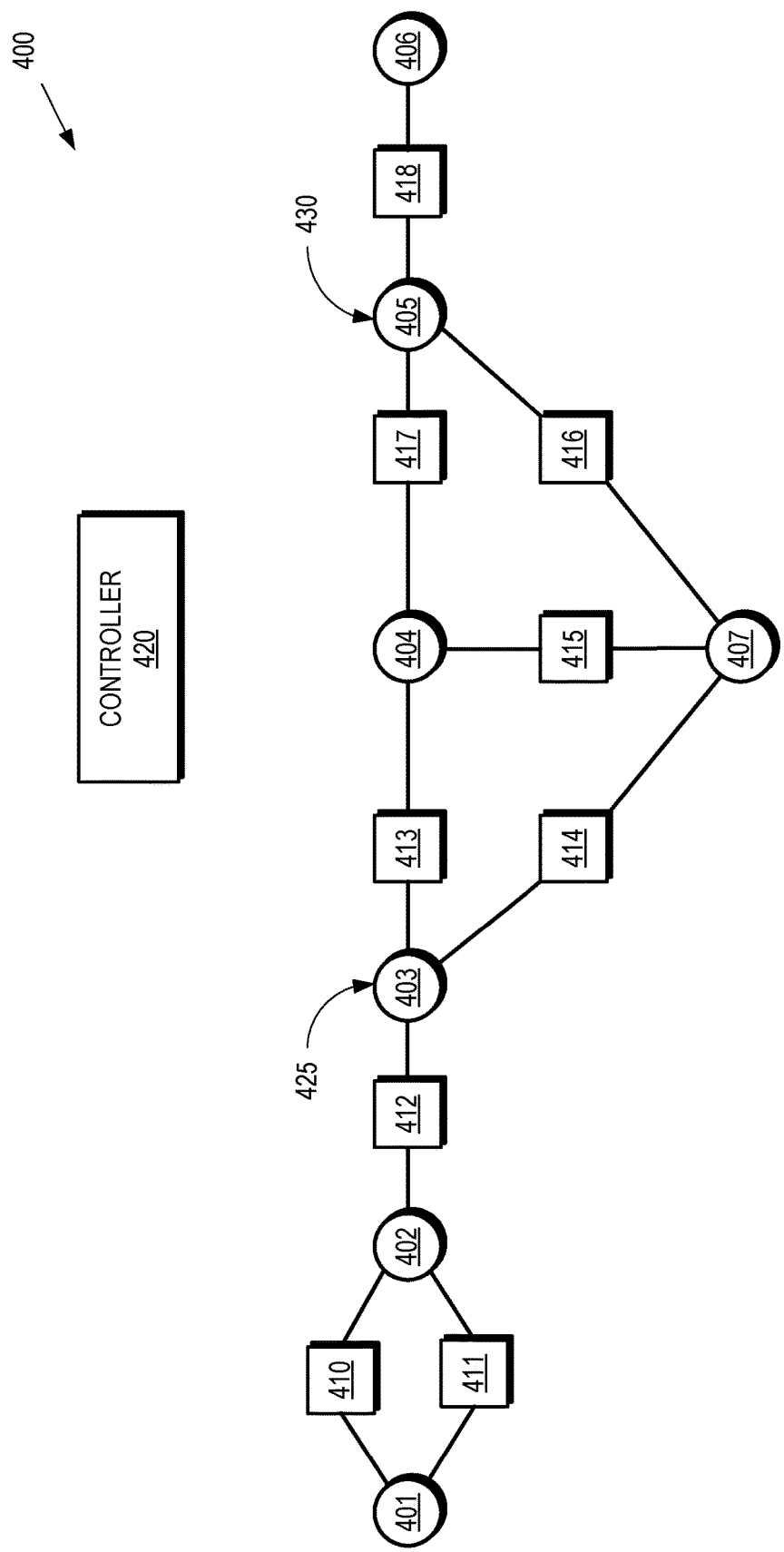
FIG. 4 is a block diagram of an abstract topology that is derived from an actual topology of the network according to some embodiments.

FIG. 4 is a block diagram of an abstract topology 400 that is derived from an actual topology of a network according to some embodiments. The abstract topology 400 includes nodes 401, 402, 403, 404, 405, 406, 407 (collectively referred to herein as "the nodes 401-407") that represent domains of the corresponding actual topology. The abstract topology 400 also includes nodes 410, 411, 412, 413, 414, 415, 416, 417, 418 (collectively referred to herein as "the nodes 410-418") that represent border routers on links between the domains corresponding to the nodes 401-407. A controller 420 (such as the controller 170 shown in FIG. 1) uses the abstract topology 400 to generate measures of reachability of nodes in the abstract topology 400.

In the illustrated embodiment, the controller 420 determines reachability of the nodes for a path from a source domain associated with the node 403 to a destination domain associated with the node 404. The controller 420 first determines whether the node 403 has a link to the node 404. A link is present and therefore no temporary links are inserted.

The controller 420 runs a bi-connected component algorithm on the abstract topology 400. The bi-connected component algorithm decomposes a graph representing the abstract topology 400 into a tree of bi-connected components that are referred to herein as clusters. The clusters are attached to each other at shared vertices that are referred to herein as articulation points. In the illustrated embodiment, the bi-connected component algorithm identifies the nodes 403, 405 as articulation points 425, 430 for the paths between the source domain and destination domain, which are represented by the nodes 403, 405, respectively. Based on the identified articulation points 425, 430, the bi-connected component algorithm identifies a first cluster including the nodes 401-403, a second cluster including the nodes 403-405, 407, and a third cluster including the nodes 405, 406. The bi-connected component algorithm identifies the clusters that form a union between the nodes 403, 404, which in this case is the second cluster. The nodes in the second cluster are therefore considered reachable and provide transit from the node 403 to the node 404 or from the node 404 to the node 403. The nodes 401, 402, 406 are not transits along the path from the node 403 to the node 404 (or vice versa) and can therefore be safely pruned from path calculations between the nodes 403, 404.

Figure 5:
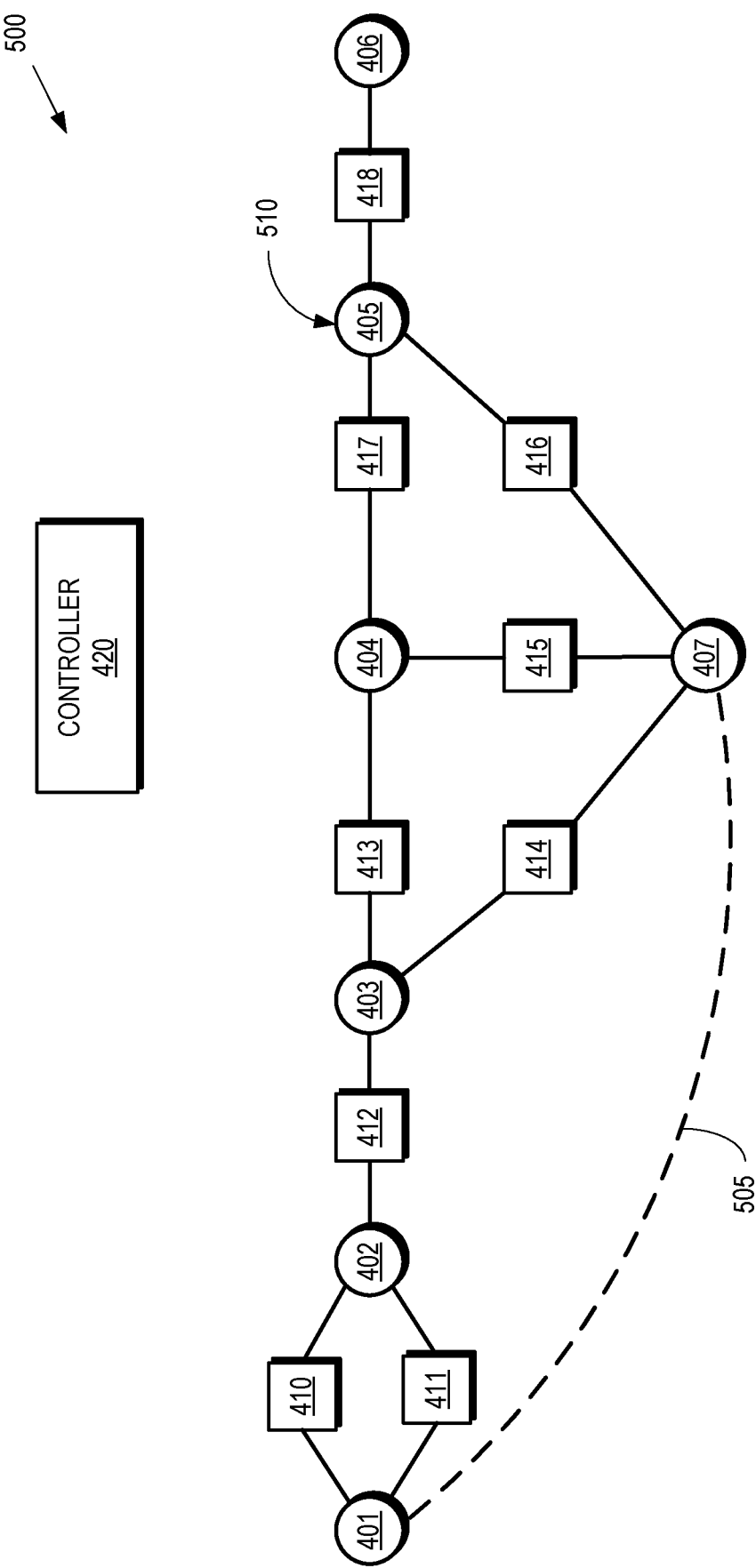
FIG. 5 is a block diagram of a first embodiment of a modified abstract topology that is derived from an actual topology of the network according to some embodiments.

FIG. 5 is a block diagram of a first embodiment of a modified abstract topology 500 that is derived from an actual topology of the network according to some embodiments. The modified abstract topology 500 is formed based on the abstract topology 400 shown in FIG. 4 and therefore includes the nodes 401-407 that represent domains of the corresponding actual topology. The modified abstract topology 500 also includes the nodes 410-418 that represent border routers on links between the domains corresponding to the nodes 401-407. The controller 420 uses the modified abstract topology 500 to generate measures of reachability of nodes in the modified abstract topology 500.

In the illustrated embodiment, the controller 420 determines reachability of the nodes for a path from a source domain associated with the node 401 to a destination domain associated with the node 407. The controller 420 first determines whether the node 401 has a link to the node 407. No link is present in the underlying abstract topology, e.g., the abstract topology 400 shown in FIG. 4. The controller 420 therefore modifies the abstract topology 400 by adding a temporary link 505 between the nodes 401, 407.

The controller 420 runs a bi-connected component algorithm on the modified abstract topology 500. In the illustrated embodiment, the bi-connected component algorithm identifies the node 405 as an articulation point 510 for the paths between the source domain and destination domain, which are represented by the nodes 401, 407, respectively. Based on the identified articulation point 510, the bi-connected component algorithm identifies a first cluster including the nodes 401-405, 407 and a second cluster including the nodes 405, 406. The bi-connected component algorithm identifies the clusters that form a union between the nodes 401, 407, which in this case is the first cluster. The nodes in the first cluster are therefore considered reachable and provide transit from the node 401 to the node 407 (or vice versa). The node 406 is not a transit along the path from the node 401 to the node 407 (or vice versa) and can therefore be safely pruned from path calculations between the nodes 401, 407.

Figure 6:
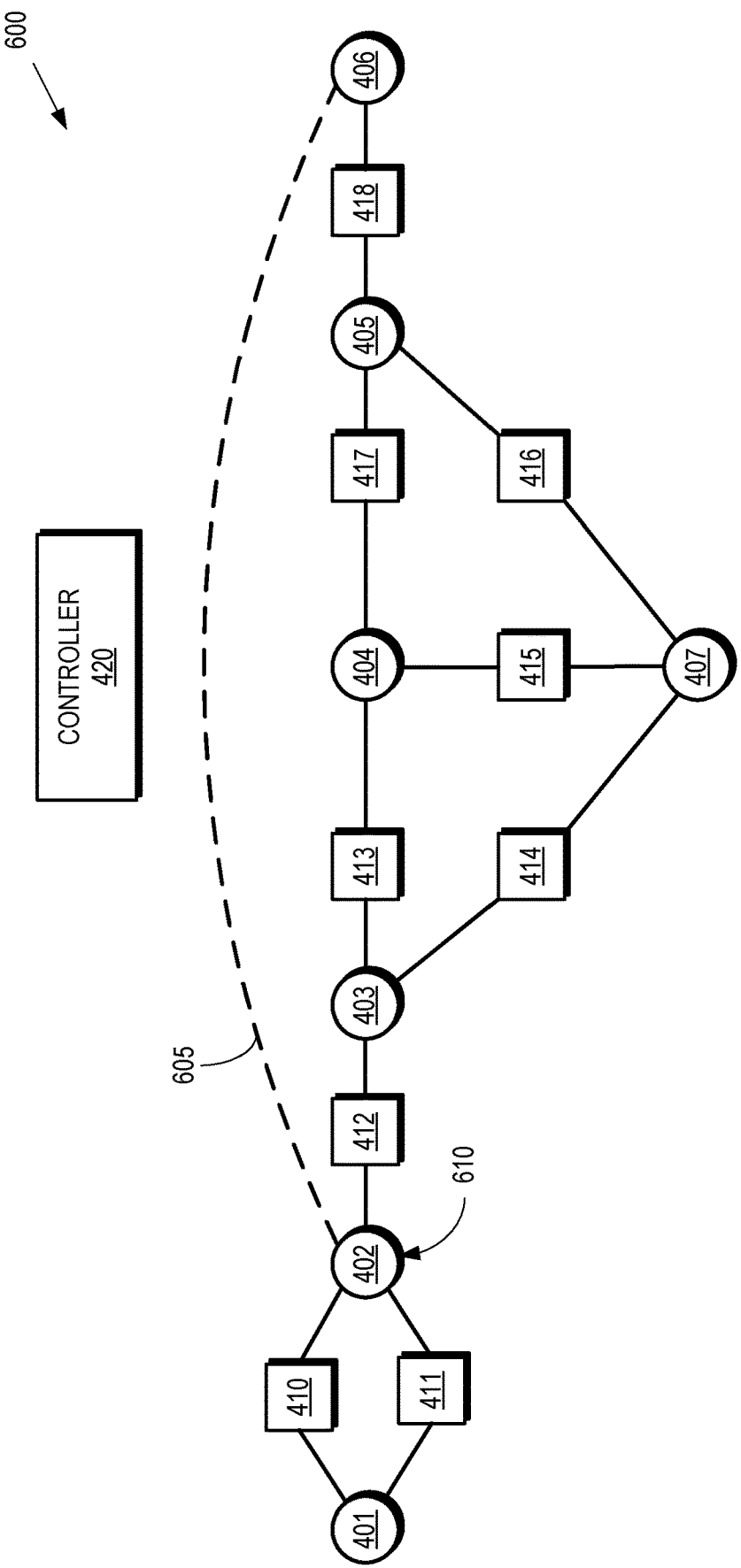
FIG. 6 is a block diagram of a second embodiment of a modified abstract topology that is derived from an actual topology of the network according to some embodiments.

FIG. 6 is a block diagram of a second embodiment of a modified abstract topology 600 that is derived from an actual topology of the network according to some embodiments. The modified abstract topology 600 is formed based on the abstract topology 400 shown in FIG. 4 and therefore includes the nodes 401-407 that represent domains of the corresponding actual topology. The modified abstract topology 600 also includes the nodes 410-418 that represent border routers on links between the domains corresponding to the nodes 401-407. The controller 420 uses the modified abstract topology 600 to generate measures of reachability of nodes in the modified abstract topology 600.

In the illustrated embodiment, the controller 420 determines reachability of the nodes for a path from a source domain associated with the node 402 to a destination domain associated with the node 406. The controller 420 first determines whether the node 402 has a link to the node 406. No link is present in the underlying abstract topology, e.g., the abstract topology 400 shown in FIG. 4. The controller 420 therefore modifies the abstract topology 400 by adding a temporary link 605 between the nodes 402, 406.

The controller 420 runs a bi-connected component algorithm on the modified abstract topology 600. In the illustrated embodiment, the bi-connected component algorithm identifies the node 402 as an articulation point 610 for the paths between the source domain and destination domain, which are represented by the nodes 402, 406, respectively. Based on the identified articulation point 610, the bi-connected component algorithm identifies a first cluster including the nodes 401, 402 and a second cluster including the nodes 402-407. The bi-connected component algorithm identifies the clusters that form a union between the nodes 402, 406, which in this case is the second cluster. The nodes in the second cluster are therefore considered reachable and provide transit from the node 402 to the node 406 (or vice versa). The node 401 is not a transit along the path from the node 402 to the node 406 (or vice versa) and can therefore be safely pruned from path calculations between the nodes 402, 406.

Figure 7:
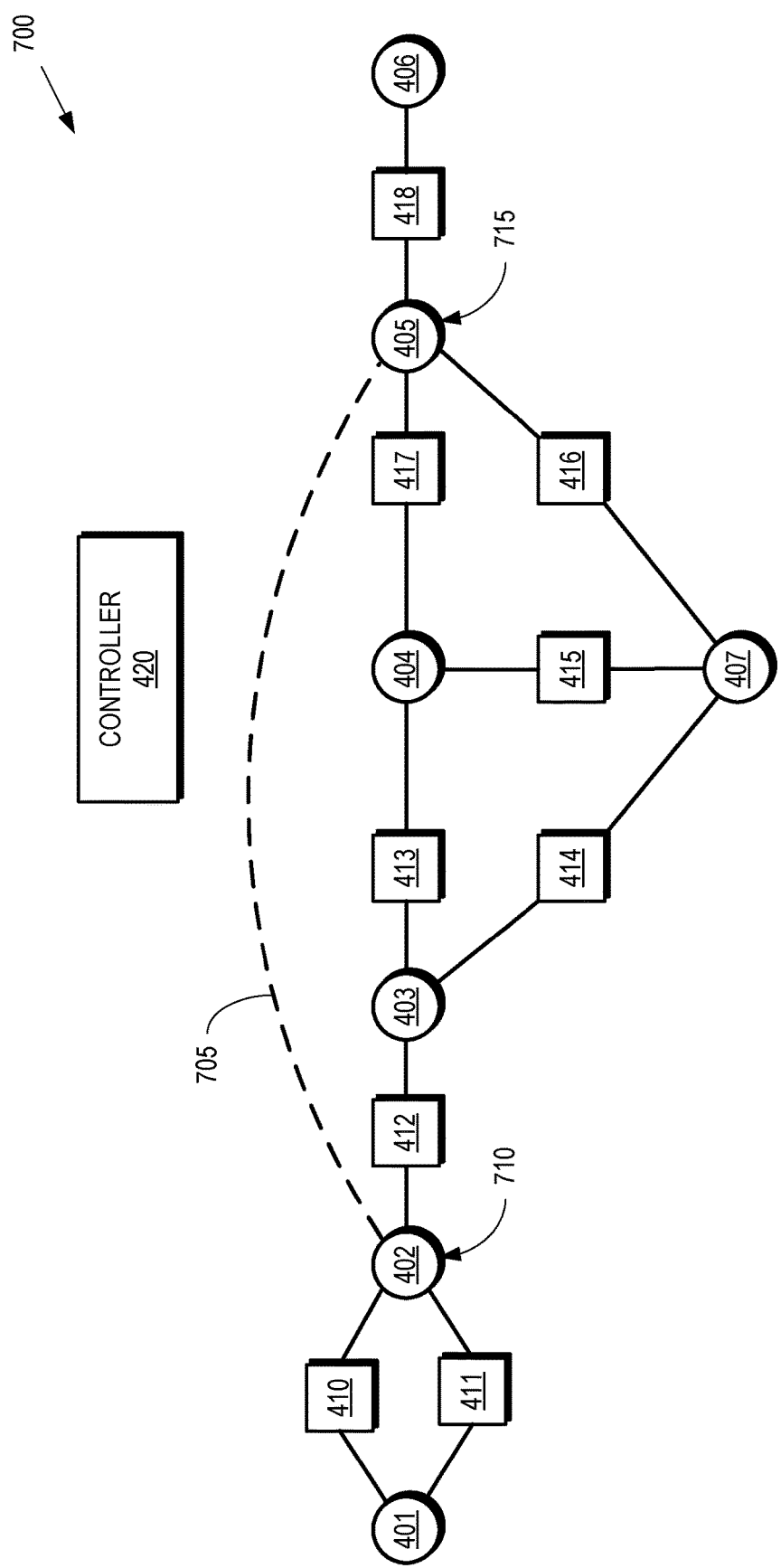
FIG. 7 is a block diagram of a third embodiment of a modified abstract topology that is derived from an actual topology of the network according to some embodiments.

FIG. 7 is a block diagram of a third embodiment of a modified abstract topology 700 that is derived from an actual topology of the network according to some embodiments. The modified abstract topology 700 is formed based on the abstract topology 400 shown in FIG. 4 and therefore includes the nodes 401-407 that represent domains of the corresponding actual topology. The modified abstract topology 700 also includes the nodes 410-418 that represent border routers on links between the domains corresponding to the nodes 401-407. The controller 420 uses the modified abstract topology 700 to generate measures of reachability of nodes in the modified abstract topology 700.

In the illustrated embodiment, the controller 420 determines reachability of the nodes for a path from a source domain associated with the node 402 to a destination domain associated with the node 405. The controller 420 first determines whether the node 402 has a link to the node 405. No link is present in the underlying abstract topology, e.g., the abstract topology 400 shown in FIG. 4. The controller 420 therefore modifies the abstract topology 400 by adding a temporary link 705 between the nodes 402, 405.

The controller 420 runs a bi-connected component algorithm on the modified abstract topology 700. In the illustrated embodiment, the bi-connected component algorithm identifies the nodes 402, 405 as articulation points 710, 715, respectively, for the paths between the source domain and destination domain, which are represented by the nodes 402, 405, respectively. Based on the identified articulation points 710, 715, the bi-connected component algorithm identifies a first cluster including the nodes 401, 402, a second cluster including the nodes 402-405, 407, and a third cluster including the nodes 405, 406. The bi-connected component algorithm identifies the clusters that form a union between the nodes 402, 405, which in this case is the second cluster. The nodes in the second cluster are therefore considered reachable and provide transit from the node 402 to the node 405 (or vice versa). The nodes 401, 406 are not transits along the path from the node 402 to the node 405 (or vice versa) and can therefore be safely pruned from path calculations between the nodes 402, 405.

Figure 8:
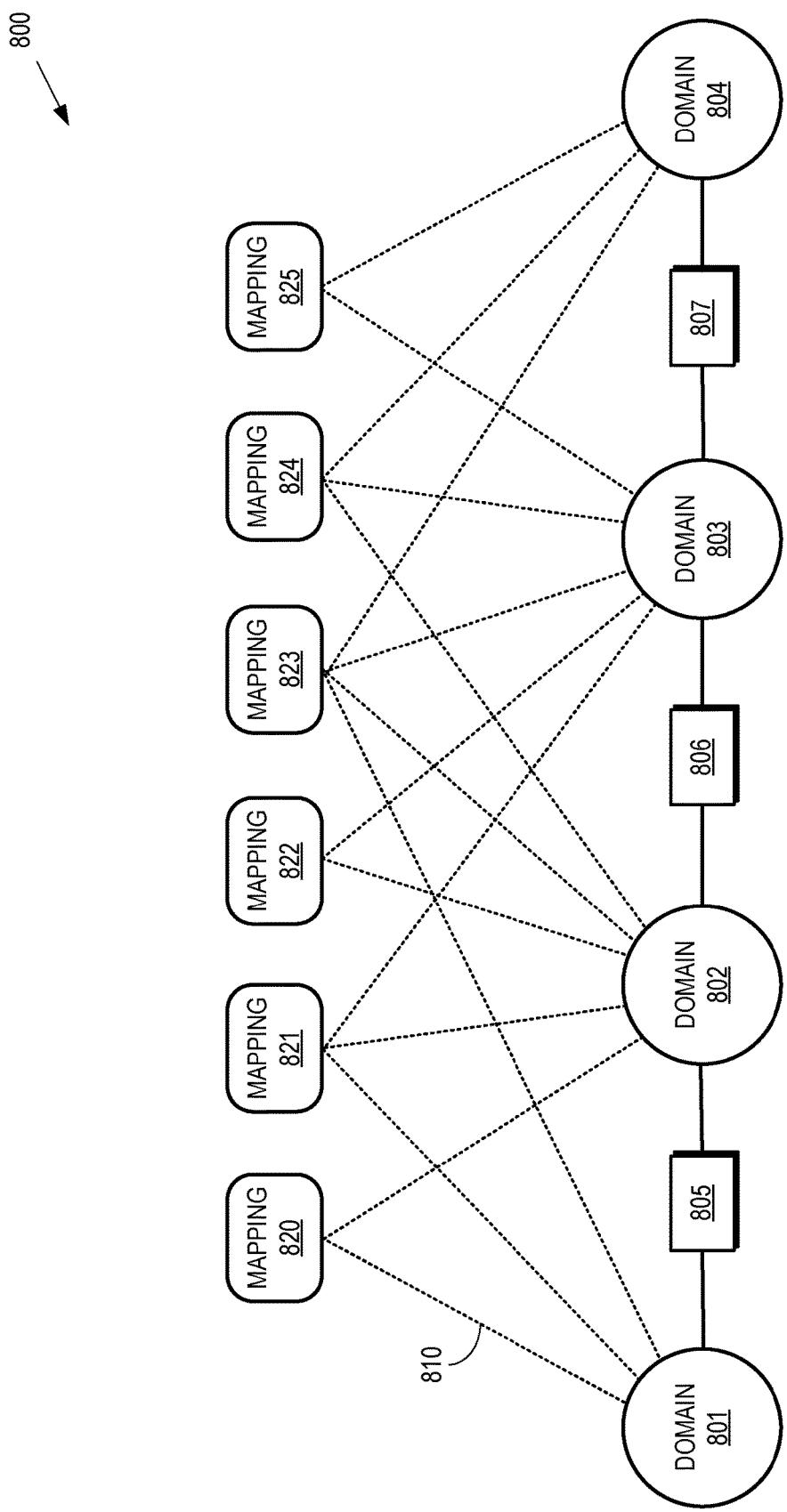
FIG. 8 is a block diagram of an abstract topology that includes information indicating mappings associated with paths through the abstract topology according to some embodiments.

FIG. 8 is a block diagram of an abstract topology 800 that includes information indicating mappings associated with paths through the abstract topology 800 according to some embodiments. The abstract topology includes domains 801, 802, 803, 804 (collectively referred to herein as "the domains 801-804") that are interconnected by border routers 805, 806, 807 (collectively referred to herein as "the border routers 805-807").

Mappings included in the abstract topology 800 include information representing the domains 801-804 along different paths. The mapping information is represented by dotted lines 810 (only one indicated by a reference numeral in the interest of clarity). In the illustrated embodiment, the mapping 820 includes information representing domains 801, 802 along a path that connects the source domain 801 and the destination domain 802. The mapping 821 includes information representing domains 801-803 along a path that connects the source domain 801 and the destination domain 803. The mapping 822 includes information representing domains 802, 803 along a path that connects the source domain 802 and the destination domain 803. The mapping 823 includes information representing domains 801-804 along a path that connects the source domain 801 and the destination domain 804. The mapping 824 includes information representing domains 802-804 along a path that connects the source domain 802 and the destination domain 804. The mapping 825 includes information representing domains 803, 804 along a path that connects the source domain 803 and the destination domain 804. Some embodiments of the mappings 820-825 are determined based on domain reachabilities associated with the different paths. For example, the mappings 820-825 can be determined using a bi-connected component algorithm as discussed herein with regard to FIGS. 4-7.

Rankings are assigned to the domains 801-804 based on the mappings 820-825. In the illustrated embodiment, the ranking for each of the domains 801-804 is equal to the number of mappings 820-825 that include the corresponding domain as a transit domain. The domain 801 has a ranking of three, the domain 802 has a ranking of five, the domain 803 has a ranking of five, and the domain 804 has a ranking of three. As discussed herein, the rankings of the domains 801-804 are used to selectively prune one or more of the domains 801-804, to modify preferences or weights associated with links between the domains 801-804, or a combination thereof.

Figure 9:
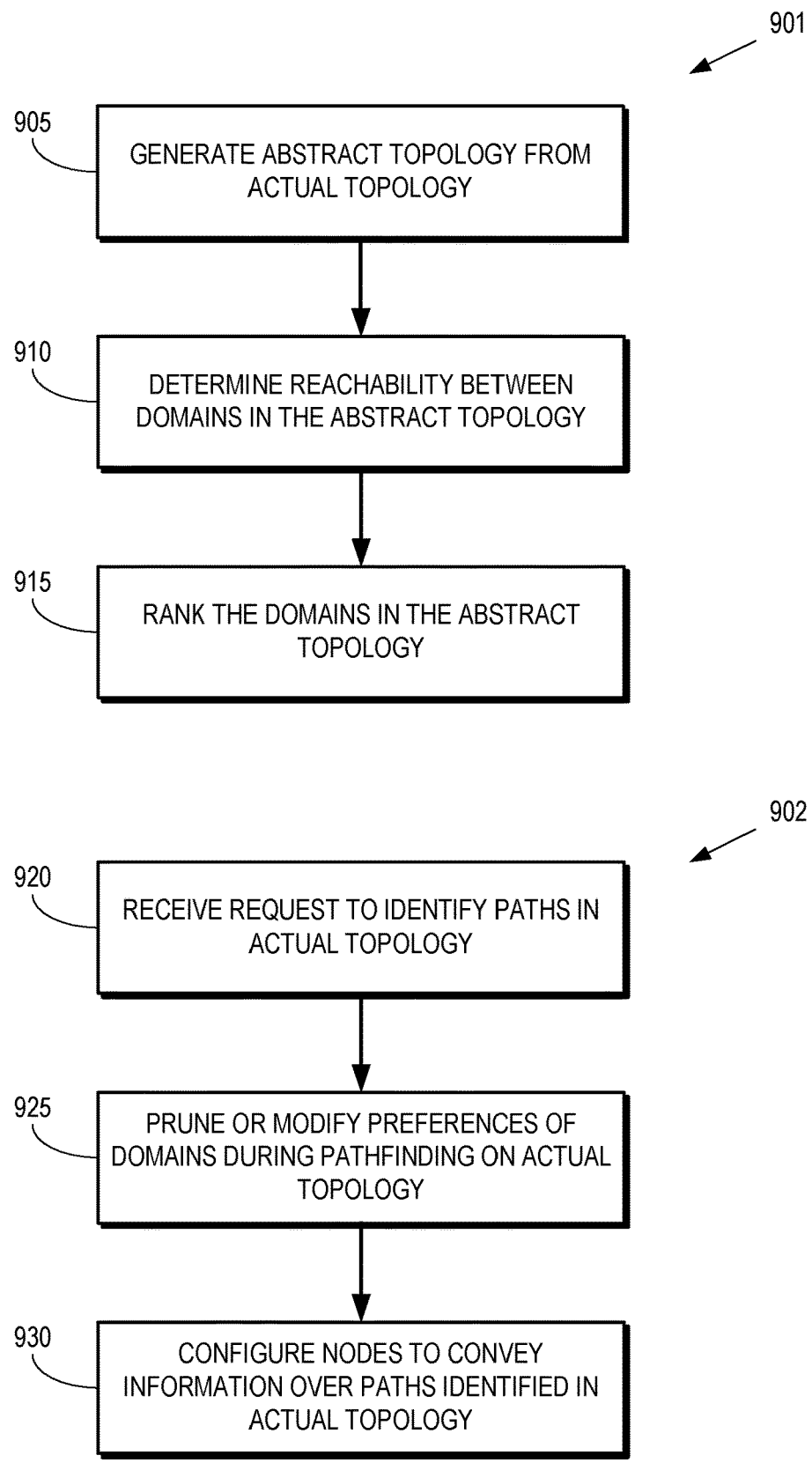
FIG. 9 is a flow diagram of a method of selectively pruning or modifying preferences of domains in an actual topology based on an abstract topology according to some embodiments.

FIG. 9 is a flow diagram of a method 901 of ranking domains in an abstract topology and a method 902 of selectively pruning or modifying preferences of the domains in the abstract topology based on the domain rankings according to some embodiments. The methods 901, 902 are implemented in some embodiments of the network including the actual topology 100 shown in FIG. 1 based on the abstract topology 200 shown in FIG. 2, the 5-stage Clos network 300 shown in FIG. 3, the network having an actual topology associated with the abstract topology 400 shown in FIGS. 4-7, and the network having an actual topology associated with the abstract topology 800 shown in FIG. 8.

The method 901 is performed prior to a request to identify paths in the actual topology. At block 905, an abstract topology is generated from an actual topology of a network. Generating the abstract topology includes identifying domains and border routers that interconnect the domains in the actual network. The abstract topology includes nodes that represent the domains and the border routers, e.g., as shown in FIG. 2.

At block 910, reachability of the domains along a path in the abstract topology is determined. As discussed herein, reachability is determined using a bi-connected component algorithm. If a source node does not have a link to a destination node for the path, one or more links are added between the source node and the destination node prior to executing the bi-connected component algorithm to determine reachability of nodes along paths between the source node and the destination node.

At block 915, ranks are assigned to the domains in the abstract topology. As discussed herein, the ranks indicate betweenness centralities of the nodes associated with the domains in the abstract topology. The domain ranks or rankings are then stored for subsequent use.

The method 902 is performed in response to receiving a request to identify paths in the actual topology. At block 920, the request is received. At block 925, domains are selectively pruned (or preferences associated with the domains are selectively modified) during pathfinding on the actual topology. The domains are selectively pruned based on information in the abstract topology including reachability information and ranks that indicate betweenness centralities of the nodes.

At block 930, a pathfinding algorithm determines, identifies, or selects a path in the actual topology from the source node to the destination node. Once identified, the network is configured to support the transmission and reception of information conveyed over the path between the source node and the destination node. In some embodiments, a router at the source node and a router at the destination node are configured to exchange IP packets over the path between the source node and the destination node.

Figure 10:
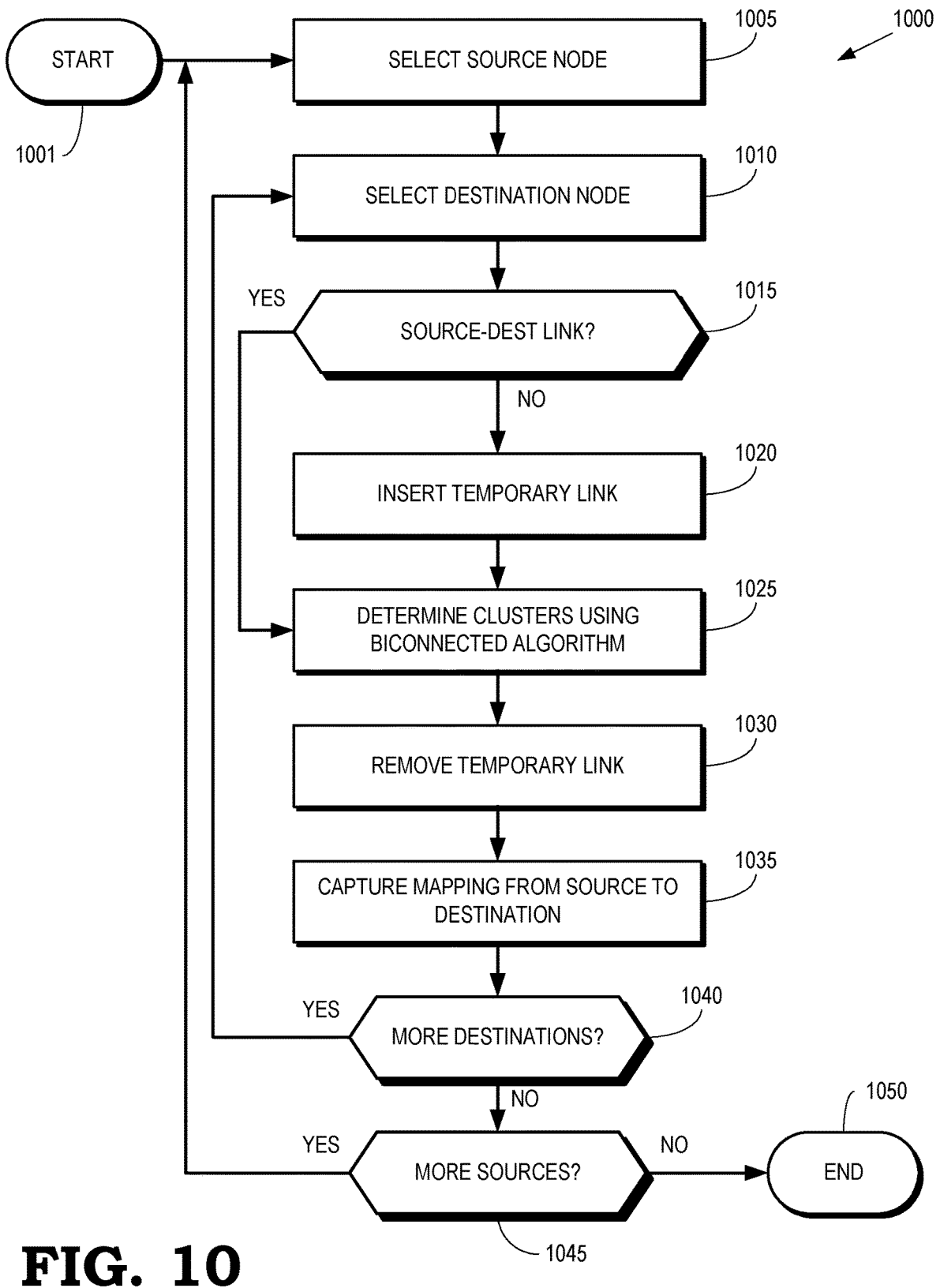
FIG. 10 is a flow diagram of a method of generating mappings between source and destination nodes in an abstract topology of a network according to some embodiments.

FIG. 10 is a flow diagram of a method 1000 of generating mappings between source and destination nodes in an abstract topology of a network according to some embodiments. The method 1000 is implemented in a controller that generates some embodiments of the mappings 820-825 shown in FIG. 8, as well as mappings for some embodiments of the abstract topology 200 shown in FIG. 2 (which is derived from the actual topology 100 shown in FIG. 1), an abstract topology representing an actual topology of the 5-stage Clos network 300 shown in FIG. 3, and the abstract topology 400 shown in FIGS. 4-7.

The method 1000 begins at the block 1001. At block 1005, the controller selects a source node from the set of nodes that represent domains in the abstract topology. At block 1010, the controller selects a destination node from the set of nodes that represent the domains in the abstract topology. At decision block 1015, the controller determines whether a link exists between the source node and the destination node. If not, the method 1000 flows to the block 1020 and the controller inserts a temporary link between the source node and the destination node. The method 1000 then flows to the block 1025. If a link already exists between the source node and the destination node, the method 1000 flows directly from the decision block 1015 to the block 1025.

The illustrated embodiment of the method 1000 identifies the presence of links between source and destination nodes in a full mesh manner so that all nodes are considered both source nodes and destination nodes. For example, the method 1000 uses a first node as a source node and a second node as a destination node in one iteration and considers the second node as the source node and the first node as the destination node in another iteration. Some embodiments of the method 1000 exploit the symmetry of the network to reduce the computational effort by considering the case where the first node is the source node and the second node is the destination node and subsequently skipping the case where the first node is the destination node and the second node is the source node because these cases refer to the same link between the first and second nodes. Criteria for deciding whether to include a node as a source node or destination node can be incorporated into one or more of the blocks 1005, 1010, 1015 to implement these (and other) techniques to exploit symmetries in source/destination nodes or other characteristics of the nodes.

At block 1025, the controller identifies one or more clusters of nodes in the abstract topology using a bi-connected component algorithm. As discussed herein, the bi-connected component algorithm decomposes a graph representing the abstract topology into clusters that are attached to each other at articulation points. Based on the articulation points for the graph (which may include temporary links), the bi-connected component algorithm identifies clusters including different subsets of the nodes. The nodes in the subsets that form a union between the source and destination nodes are considered reachable and provide transit between the source and destination nodes. If temporary links were inserted (at block 1020), the temporary links are removed at block 1030. At block 1035, the controller captures the mapping between the source node and the destination node. The mapping includes information representing the reachable nodes to provide transit between the source and destination nodes.

At decision block 1040, the controller determines whether there are additional destination nodes associated with the source node. If so, the method 1000 flows to block 1010 and a new destination node is selected. If not, the method 1000 flows to decision block 1045. The controller determines (at decision block 1045) whether there are additional source nodes in the abstract topology. If so, the method 1000 flows to block 1005 and a new source node is selected. Otherwise, the method 1000 flows to block 1050 and the method 1000 ends.

Figure 11:
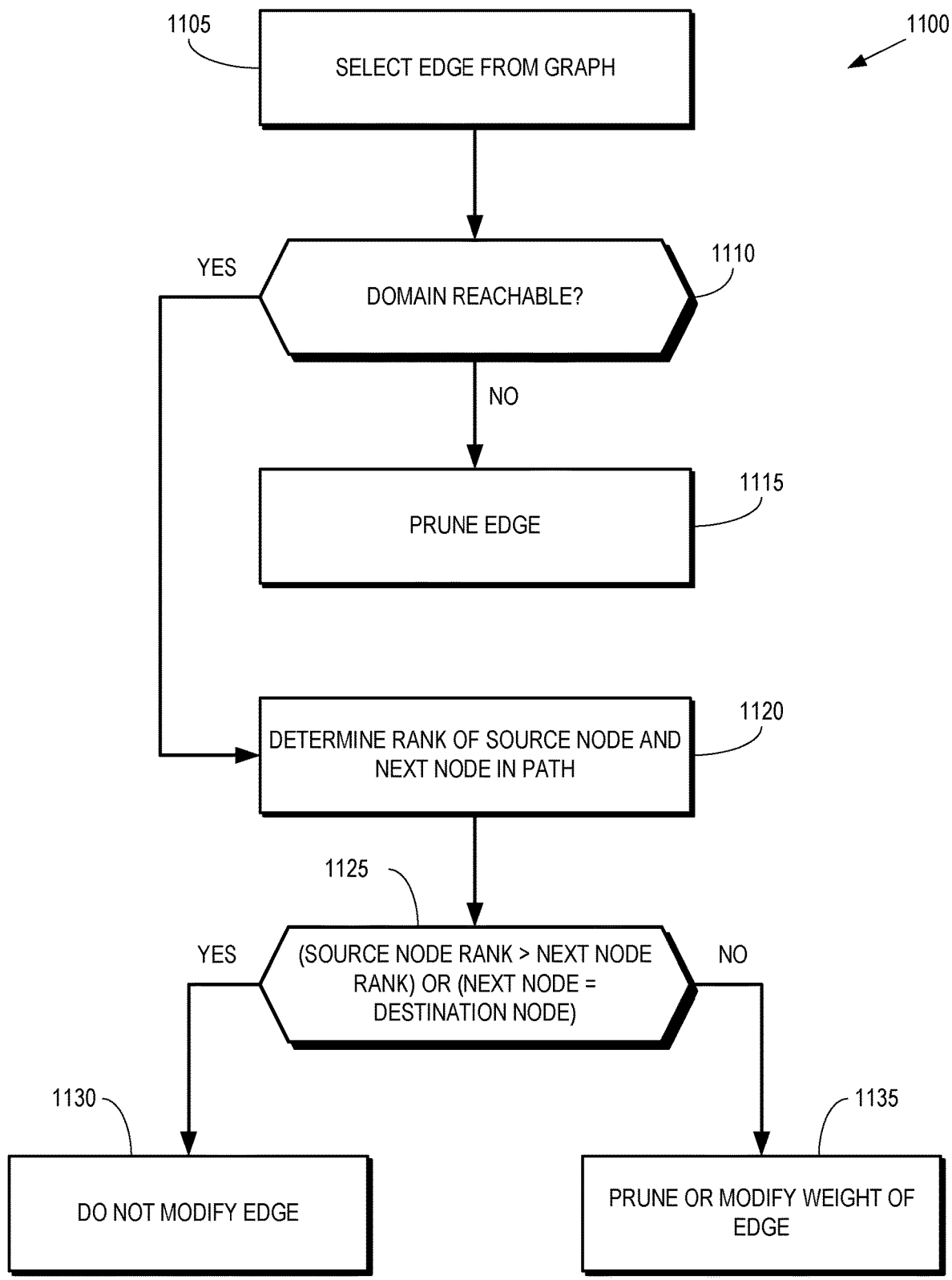
FIG. 11 is a flow diagram of a method of selectively pruning or modifying weights of edges in an actual topology based on rankings of nodes in an abstract topology of a network according to some embodiments.

FIG. 11 is a flow diagram of a method 1100 of selectively pruning or modifying weights of edges in an actual topology based on rankings of nodes in an abstract topology of a network according to some embodiments. The method 1100 is implemented in a controller such as the controller 170 that performs pathfinding in the actual topology 100 shown in FIG. 1 based on the abstract topology 200 shown in FIG. 2, a controller that performs pathfinding within an actual topology of the 5-stage Clos network 300 shown in FIG. 3, a controller that performs pathfinding in an actual topology associated with the abstract topology 400 shown in FIGS. 4-7, and a controller that performs pathfinding in an actual topology associated with the abstract topology 800 shown in FIG. 8. The controller performs the method 1100 in conjunction with executing a pathfinding algorithm, concurrently with executing the pathfinding algorithm, or in response to initiating execution of the pathfinding algorithm for traversals between a source node and a destination node in a network.

At block 1105, the controller selects an edge from a graph that represents the abstract topology for the actual topology used during the pathfinding operation. The edge is connected to a node in the graph that represents a domain in the abstract topology. The domain is a candidate for pruning or preferencing, e.g., by modifying a weight of the edge. In some embodiments, the edge is associated with a border router that connects to the domain.

At decision block 1110, the controller determines whether the domain is reachable. As discussed herein, reachability of the domain is determined using a bi-connected component algorithm to identify reachable domains on paths between the source node and the destination node. If the domain is not reachable along a path between the source node and the destination node, the method flows to the block 1115 and the edge (or the domain) is pruned and the pathfinding algorithm does not consider the domain. If the domain is reachable, the method 1100 flows to the block 1120.

At block 1120, the controller determines rankings of the source node and the next node in the path that is being assessed by the pathfinding algorithm. As discussed herein, the rankings are determined based on how many mappings of paths between the source node and the destination node in the graph that represents the abstract topology include the corresponding node as a transit node.

At decision block 1125, the controller determines whether the ranking of the source node is greater than the ranking of the next node. If so, the domain should be considered by the pathfinding algorithm during traversals so the method 1100 flows to the block 1130 and the edge is not pruned or modified. The controller also determines whether the next node is the destination node. If so, the domain should be considered by the pathfinding algorithm (regardless of the rank of the destination node) and method 1100 flows to block 1130. If the rank of the next node is less than or equal to the source node rank, and the next node is not the destination node, the method 1100 flows to the block 1135.

At block 1135, the controller prunes or modifies a weight of the edge. In some embodiments, the controller performs hard pruning and does not permit the edge (or link) to be expanded pondering the path traversal. Pruning the edge constrains the path to follow the higher ranking, core, transit links through the graph. In some embodiments, the controller modifies the weight of the edge to reduce a preference (or increase a cost) associated with paths that traverse the edge. For example, the controller can modify the weight of the edge relative to the domain rank to give the link a lower preference for traversal, e.g., as determined by a shortest path first pathfinding algorithm. Paths that include the lower preference link may be used as last resort paths if no other paths are available. Thus, increasing the cost of the link by modifying the weight of the corresponding edge causes the pathfinding algorithm to avoid evaluating or traversing the link until lower-cost links have been exhausted, thereby increasing the likelihood that a lower cost traffic engineer path is found sooner.

Figure 12:
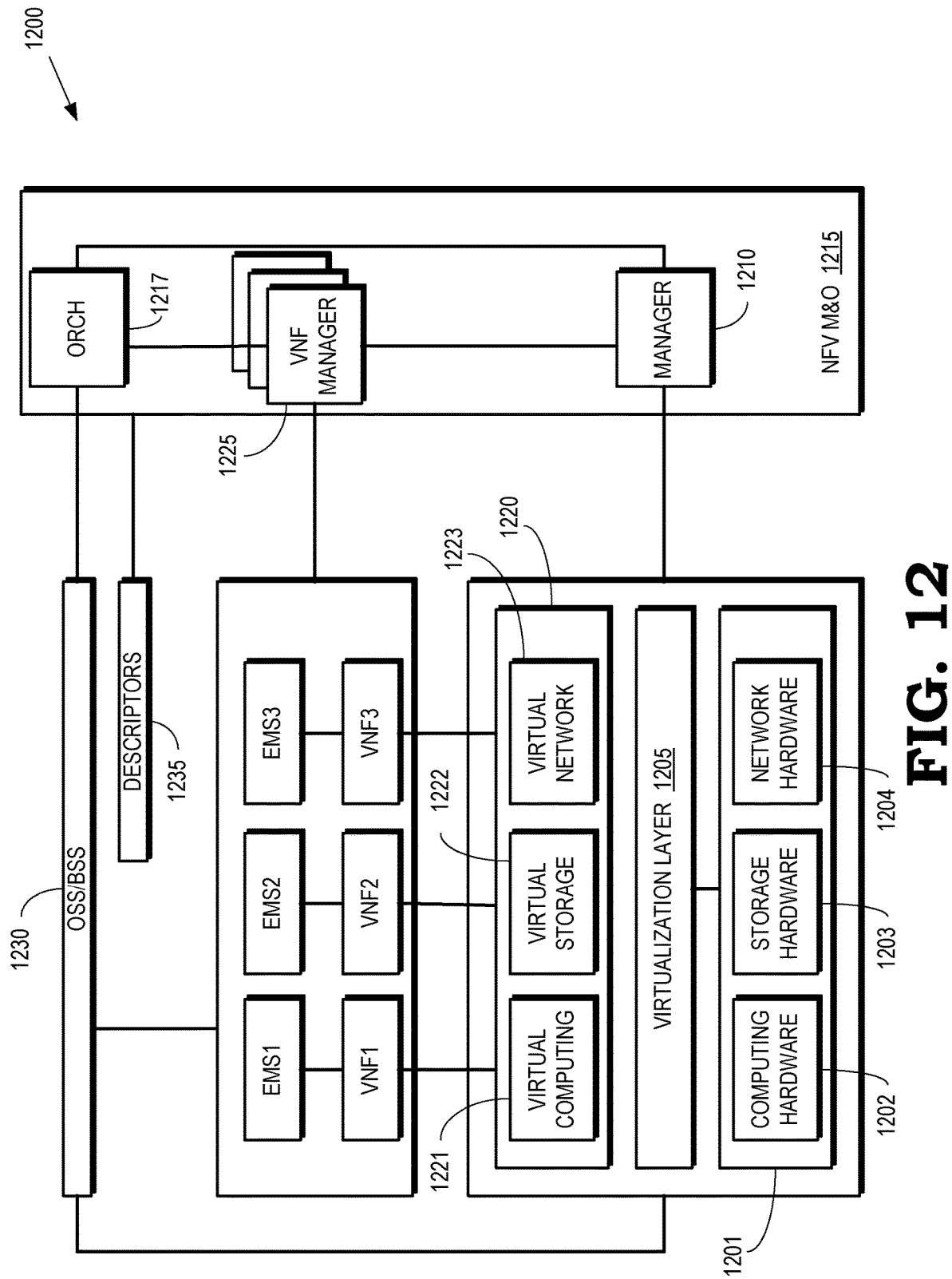
FIG. 12 is a block diagram of a network function virtualization (NFV) architecture according to some embodiments.

FIG. 12 is a block diagram of a network function virtualization (NFV) architecture 1200 according to some embodiments. The NFV architecture 1200 is used to implement some embodiments of a network that has the actual topology 100 shown in FIG. 1 and the abstract topology 200 shown in FIG. 2, the 5-stage Clos network 300 shown in FIG. 3, a network associated with the abstract topology 400 shown in FIGS. 4-7, and a network associated with the abstract topology 800 shown in FIG. 8. The NFV architecture 1200 includes hardware resources 1201 including computing hardware 1202, storage hardware 1203, and network hardware 1204. The computing hardware 1202 is implemented using one or more processors, the storage hardware 1203 is implemented using one or more memories, and the network hardware 1204 is implemented using one or more transceivers, transmitters, receivers, interfaces, and the like.

A virtualization layer 1205 provides an abstract representation of the hardware resources 1201. The abstract representation supported by the virtualization layer 1205 can be managed using a virtualized infrastructure manager 1210, which is part of the NFV management and orchestration (M&O) module 1215. Some embodiments of the manager 1210 are configured to collect and forward performance measurements and events that may occur in the NFV architecture 1200. For example, performance measurements may be forwarded to an orchestrator (ORCH) 1217 implemented in the NFV M&O 1215. The hardware resources 1201 and the virtualization layer 1205 may be used to implement virtual resources 1220 including virtual computing resources 1221, virtual storage resources 1222, and virtual networking resources 1223.

Virtual networking functions (VNF1, VNF2, VNF3) run over the NFV infrastructure (e.g., the hardware resources 1201) and utilize the virtual resources 1220. For example, the virtual networking functions (VNF1, VNF2, VNF3) may be implemented using virtual machines supported by the virtual computing resources 1221, virtual memory supported by the virtual storage resources 1222, or virtual networks supported by the virtual network resources 1223. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 1225 that exchanges information and coordinates actions with the manager 1210 or the orchestrator 1217.

The NFV architecture 1200 may include an operation support system (OSS)/business support system (BSS) 1230. The OSS/BSS 1230 deals with network management including fault management using the OSS functionality. The OSS/BSS 1230 also deals with customer and product management using the BSS functionality. Some embodiments of the NFV architecture 1200 use a set of descriptors 1235 for storing descriptions of services, virtual network functions, or infrastructure supported by the NFV architecture 1200. Information in the descriptors 1235 may be updated or modified by the NFV M&O 1215.

The NFV architecture 1200 implements network slices that provide control plane functions or user plane functions. A network slice is a complete logical network that provides communication services and network capabilities, which can vary from slice to slice. User equipment can concurrently access multiple slices that support multiple service flows between a core network and the user equipment. Some embodiments of user equipment provide Network Slice Selection Assistance Information (NSSAI) parameters to the network to assist in selection of a slice instance for the user equipment. A single NSSAI may lead to the selection of several slices. The NFV architecture 1200 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different slices.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
a) hardware-only circuit implementations (such as implementations and only analog and/or digital circuitry) and
b) combinations of hardware circuits and software, such as (as applicable):
 i. a combination of analog and/or digital hardware circuit(s) with software/firmware and
 ii. any portions of a hardware processor(s) with software (including digital signal processor(s), software, and memory(ies) that work together to cause an apparatus, such as a mobile phone or server, to perform various functions) and
c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
generating, at a processor, an abstract topology that represents domains in an actual topology of a network and border routers that interconnect the domains in the actual topology;
determining, at the processor based on the actual topology, a path from a source node to a destination node, wherein the determining includes pruning, based on the abstract topology and based on respective measures of reachability of the domains and respective ranks of the domains, at least one of the domains from the actual topology during path calculations on the actual topology, wherein the respective ranks of the domains are indicative of respective numbers of pairs of domains that use the respective domains as a transit domain; and
configuring, at the processor, at least one of the source node and the destination node to support communication of packets over the path.

2. The method of claim 1, wherein generating the abstract topology comprises generating a graph comprising nodes to represent the domains and the border routers, wherein the graph represents mappings between pairs of domains and indicates domains that are used in transit between the pairs of domains.

3. The method of claim 2, further comprising:
determining the measures of reachability of the domains to indicate whether the domains represented by the nodes are on a path from a source domain to a destination domain.

4. The method of claim 3, wherein determining the measures of reachability of the domains comprises determining betweenness centralities for the nodes, wherein the betweenness centralities indicate how many pairs of domains use the domains associated with the nodes as a transit.

5. The method of claim 4, wherein determining the betweenness centralities for the nodes comprises determining a number of interconnections that exist between the nodes and other nodes in the graph.

6. The method of claim 5, further comprising:
modifying the graph by inserting at least one temporary link between a destination node that represents the destination domain in the graph and at least one node in the graph that does not have a physical link to the destination node prior to determining the betweenness centralities; and
wherein determining the betweenness centralities comprises determining the betweenness centralities based on the modified graph.

7. The method of claim 3, wherein pruning the at least one of the domains from the actual topology comprises pruning the at least one of the domains based on resources of the nodes in the abstract topology that are reachable on at least one path between a source node and a destination node, as indicated by the measures of reachability such that a pathfinding algorithm does not consider paths that include routers in the at least one pruned domain.

8. The method of claim 7, further comprising:
assigning the ranks of the domains to the domains based on the measures of reachability of the corresponding domains represented by the nodes.

9. The method of claim 8, further comprising:
comparing the ranks of the source node and the nodes in the abstract topology; and
selectively pruning a relationship to at least one edge in the actual topology based on the comparison of the ranks of the source node and the nodes in the abstract topology.

10. The method of claim 8, further comprising:
modifying weights of edges between the nodes in the actual topology based on the ranks of the nodes in the abstract topology to preference links to higher ranks nodes during path traversals of the actual topology.

11. An apparatus comprising:
a memory to store information representing an actual topology of a network; and
a processor to:
generate an abstract topology that represents domains and border routers that interconnect the domains in the actual topology;
determine, based on the actual topology, a path from a source node to a destination node, including pruning, based on the abstract topology and based on respective measures of reachability of the domains and respective ranks of the domains, at least one of the domains from the actual topology during path calculations on the actual topology, wherein the respective ranks of the domains are indicative of respective numbers of pairs of domains that use the respective domains as a transit domain;
configure at least one of the source node and the destination node to support communication of packets over the path; and
store information representing the path in the memory.

12. The apparatus of claim 11, wherein the processor is configured to generate a graph comprising nodes to represent the domains and the border routers, wherein the graph represents mappings between pairs of domains and indicates domains that are used in transit between the pairs of domains.

13. The apparatus of claim 12, wherein the processor is configured to determine the measures of reachability of the domains to indicate whether the domains represented by the nodes are on a path from a source domain to a destination domain.

14. The apparatus of claim 13, wherein the processor is configured to determine betweenness centralities for the nodes, wherein the betweenness centralities indicate how many pairs of domains use the domains associated with the nodes as a transit.

15. The apparatus of claim 14, wherein the processor is configured to determine the betweenness centralities based on how many interconnections exist between the nodes and other nodes in the graph.

16. The apparatus of claim 15, wherein the processor is configured to:
modify the graph by inserting at least one temporary link between a destination node that represents the destination domain in the graph and at least one node in the graph that does not have a physical link to the destination node prior to determining the betweenness centralities; and
determine the betweenness centralities based on the modified graph.

17. The apparatus of claim 13, wherein the processor is configured to prune the at least one of the domains based on resources of the nodes in the abstract topology that are reachable on at least one path between a source node and a destination node, as indicated by the measures of reachability such that a pathfinding algorithm does not consider paths that include routers in the at least one pruned domain.

18. The apparatus of claim 17, wherein the processor is configured to assign the ranks to the domains based on the measures of reachability of the corresponding domains represented by the nodes.

19. The apparatus of claim 18, wherein the processor is configured to compare the ranks of the source node and the nodes in the abstract topology and selectively prune a relationship to at least one edge in the actual topology based on the comparison of the ranks of the source node and the nodes in the abstract topology.

20. The apparatus of claim 18, wherein the processor is configured to modify weights of edges between the nodes in the actual topology based on the ranks of the nodes in the abstract topology to preference links to higher ranks nodes during path traversals of the actual topology.

21. An apparatus comprising:
at least one processor; and
at least one memory including computer program code;
the at least one memory and the computer program code configured to, with the at least one processor, cause the apparatus at least to perform:
generating an abstract topology that represents domains in an actual topology of a network and border routers that interconnect the domains in the actual topology;

determining, based on the actual topology, a path from a source node to a destination node, wherein the determining includes pruning, pruning, based on the abstract topology and based on respective measures of reachability of the domains and respective ranks of the domains, at least one of the domains from the actual topology during path calculations on the actual topology, wherein the respective ranks of the domains are indicative of respective numbers of pairs of domains that use the respective domains as a transit domain; and configuring, at the processor, at least one of the source node and the destination node to support communication of packets over the path.

22. The apparatus of claim 21, wherein the at least one memory and the computer program code are configured to, with the at least one processor, cause the apparatus at least to perform:

determining the measures of reachability of the domains to indicate whether the domains represented by the nodes are on a path from a source domain to a destination domain.

23. The apparatus of claim 22, wherein the at least one memory and the computer program code are configured to, with the at least one processor, cause the apparatus at least to perform:

assigning the ranks of the domains to the domains based on the measures of reachability of the corresponding domains represented by the nodes; and selectively pruning a relationship to at least one edge in the actual topology or modifying weights of edges between the nodes in the actual topology based on the ranks of the nodes in the abstract topology.

* * * * *